Figure 1:
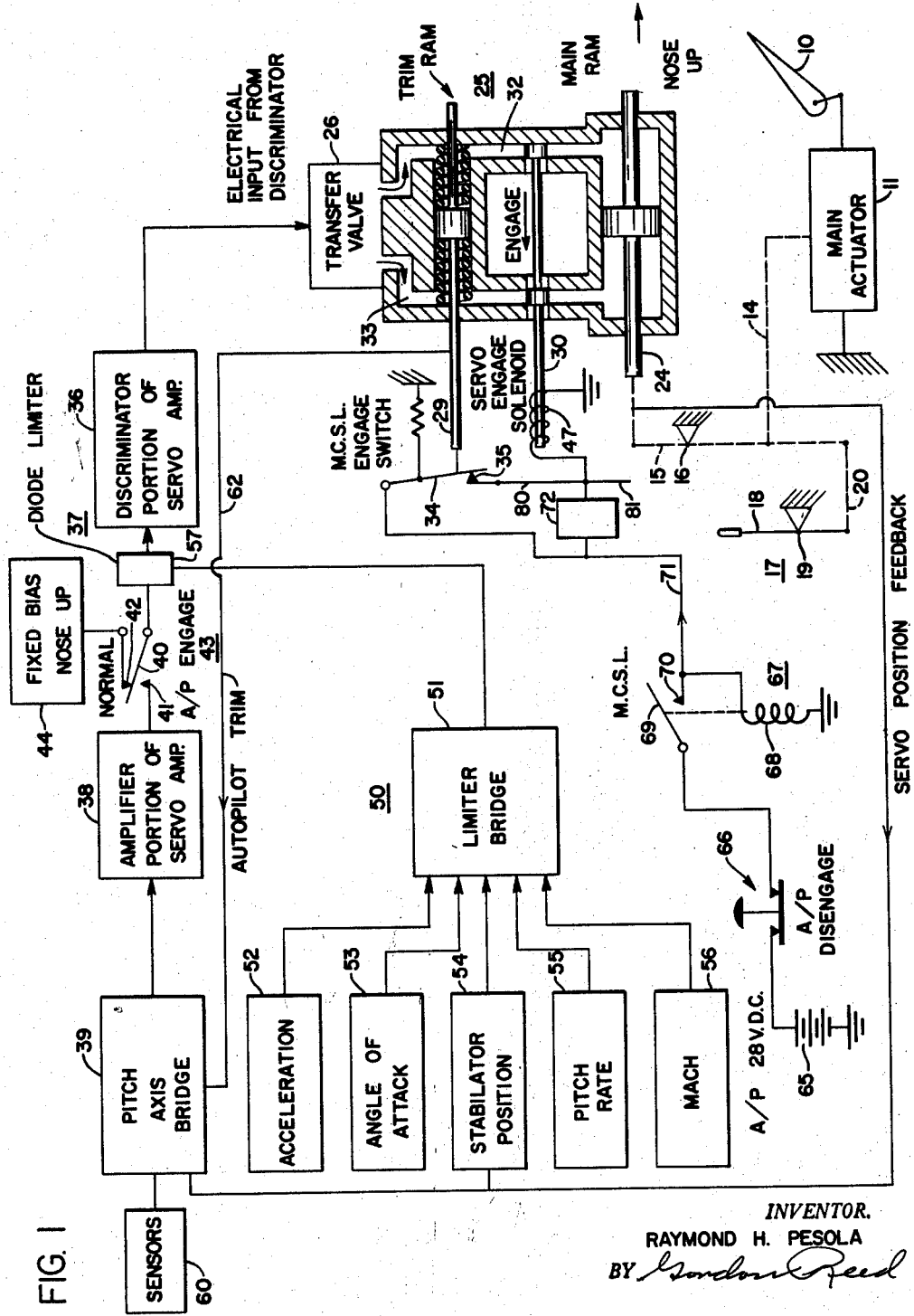

INVENTOR.
RAYMOND H. PESOLA
BY Gordon Reed

United States Patent Office 3,081,968
Patented Mar. 19, 1963

1

3,081,968
CONTROL APPARATUS
Raymond H. Pesola, New Brighton, Minn., assignor to Minneapolis-Honeywell Regulator Company, Minneapolis, Minn., a corporation of Delaware
Filed May 27, 1960, Ser. No. 32,472
21 Claims. (Cl. 244—76)

This invention relates to monitoring arrangements for control apparatus and in particular to flight condition limit monitoring arrangements for automatic control of an aircraft. The present monitoring arrangement serves primarily to prevent excessive pitch up attitudes and also limits acceleration stresses or G loads upon the structure of the aircraft or personnel therein.

In an aircraft which is directly manually controlled from a pilot controller as well as one wherein the control is provided through automatic sensing devices responsive to varying aircraft flight attitudes or positions, it is desirable to prevent accelerations or G loads during such control tending to over stress the structure of the aircraft. Safe G load conditions for the aircraft can be again effected by interrupting the motion of control surfaces of the craft by the manually operable pilot controller or automatic sensing devices at peak G loads and applying a limit function control to such control surfaces.

While monitoring arrangements have been provided heretofore which incorporated a limit function which the aircraft flight conditions were not be exceed, to prevent over stressing the structure of an aircraft, an example of which is disclosed in the patent of John C. Larson, 2,978,210, filed October 28, 1955, such monitoring arrangement for limiting the G loading on the craft has not been operative during direct manual control of the aircraft by the pilot.

An object of this invention therefore, is to provide a monitoring arrangement for an aircraft effective during direct manual control of the aircraft to prevent the flight condition of the craft attendant thereon from exceeding a limit function.

A further object of this invention is to provide a monitoring arrangement of a flight condition of an aircraft whereby a normally inoperable servomotor is automatically rendered operable on attitude changing means of the craft to maintain the flight condition thereof within the predetermined limit function magnitude.

A further object of this invention is to utilize portions of an automatic pilot during standby condition as portions of the monitoring arrangement for a flight condition of an aircraft during manual operation or manual control of the craft.

A further object of this invention is to permit the pilot operated controller to retain control of the craft even when the flight condition approaches or attains the limit function and the monitoring arrangement assumes control of the craft momentarily should the pilot apply a control tending to reduce the flight condition below the limit function magnitude.

Further objects and advantages of the invention will be better understood from the following description considered in connection with the accompanying drawings disclosing an embodiment thereof by way of example.

Figure 2:
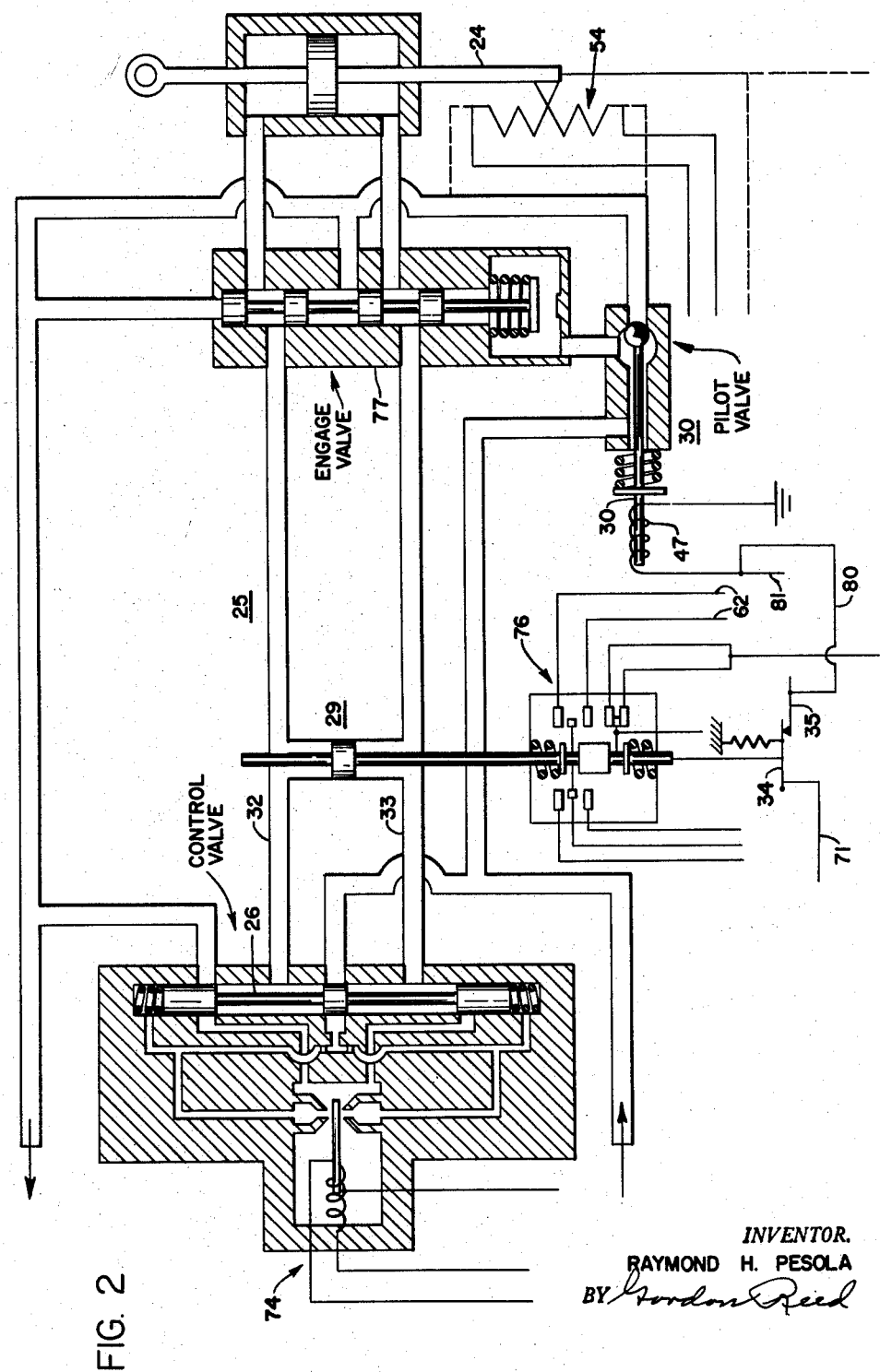

In the drawings:
FIGURE 1 is a block diagram of the invention;
FIGURE 2 shows in greater detail a preferred form of the hydraulic servomotor shown in FIGURE 1;

The invention is disclosed herein by way of example as an improvement in flight control systems for aircraft utilizing a command signal limiting system for an automatic flight control system which is disclosed in an application of Donald J. Rotier, Serial No. 772,316, filed November 6, 1958. The present arrangement extends the command signal limiting action or function for an automatic flight control system to also include such limiting action during direct manual control of an aircraft. Thus, by the present arrangement, command signal limiting is provided during manual mode control of an aircraft as well as during automatic stabilization or automatic steering control of the craft.

In the past, command signal limiting was not effective during direct manual control of the craft when the automatic flight control system was in standby condition. During such standby condition, the automatic flight control system was being continuously synchronized or trimmed to the attitude of the aircraft assumed during manual control of the craft. The provisions herein of this manual command signal limiting arrangement dispenses with the continuing synchronizing or trimming of the automatic steering system during craft attitude changes while on manual mode control and causes the trimming or synchronizing to be effected only shortly prior to initiation of automatic flight control. One arrangement wherein the automatic steering system is synchronized or trimmed to the attitude of an aircraft wherein it is installed during direct manual control of the aircraft is disclosed in a patent of Corles M. Perkins, No. 2,960,284, filed January 11, 1957. The disclosure in this Perkins application will be referred to later in connection with the subsequent description herein.

Respecting the invention, the essential parts thereof comprise an automatic flight control system comprising a hydraulic servomotor which controls a main power actuator to position a control surface. In standby operation of the automatic flight control system, a manual controller may directly control the main power actuator for positioning the control surface. A command signal limiting arrangement may selectively cooperate either with the automatic flight control system or with the manual controller to prevent excessive pitch up attitude and over stress of the aircraft.

In the standby mode of the automatic flight control system, the command signal limiting arrangement automatically controls the hydraulic servomotor only whenever a predetermined limit function or limiting signal is exceeded. This limiting signal is based on the aircraft flight condition, and it is provided by sensors in the limiting arrangement. The command signal limiting arrangement during manual mode control, but only when the limiting signal is exceeded, both engages or operatively connects the hydraulic servomotor with a controller for the main power actuator to render the actuator operable by the servomotor, but also during such engagement, the command signal limiting arrangement controls operation of the servomotor.

Referring to FIGURE 1, a control surface 10 of an aircraft which may be the stabilator or elevator surface thereof, is positioned by a main power actuator 11. The main actuator may be of the hydraulic type comprising a piston and slidable control valve wherein the displacement of the piston is proportional to the displacement of the control valve. Such control valve may be displaced by an operating means 14 positioned by a linkage such as a lever 15 pivoted at 16 on the craft. The valve operating means 14 may be directly positioned by a manually operable pilot controller 17 consisting of the conventional control stick 18 pivoted on the craft at 19 and having a link 20 connected to lever 15.

The lever 15 may also be angularly displaced by the operation of a main piston 24 of a hydraulic servomotor 25. The servomotor 25 which is shown in greater detail in FIGURE 2 comprises essentially a transfer or control valve 26, a trim piston 29, a servo engage valve 77, and a solenoid operated pilot valve 30. The trim piston 29 responds to differential fluid pressure in passages 32, 33 caused by displacement of transfer valve 26. In the absence of differential pressure in said passages the piston is centered by suitable spring means and when centered, operates switch arm 34 into engagement with a resiliently pivoted switch contact 35 thereby closing a circuit to operating winding 47 of the solenoid operated pilot valve 30. Operation of the solenoid valve 30 engages piston 24 and valve operating means 14 and permits transmission of any subsequent additional differential pressure tending to move the trim piston leftwardly in FIGURE 1 to the main piston 24 for operation of the surface 10.

The differential pressure in passages 32, 33 is derived from a pressure source (not shown) upon displacement of the transfer valve 26 as stated which is operated by torque windings energized from the output of an A.C. discriminator portion 36 of a servo-amplifier 37.

The servo-amplifier 37 includes an amplifier portion 38 which is controlled by a balanceable network 39 of a pitch axis control network of the automatic flight control system 43 during automatic flight control or automatic steering.

During standby of the pitch axis control network 39, the amplifier portion 38 is disconnected from the discriminator portion by disengaging switch arm 40 from switch contact 41 and engaging it with switch contact 42. Switch contact 42 is energized from a fixed bias voltage source 44 which develops an alternating voltage of a desired magnitude, and in general, supplies a control voltage similar to the output of amplifier 11 of the Rotier application. The discriminator portion 36 while controlled from the fixed bias source 44 through diode limiter 57 similar to limiter 12 of Rotier is simultaneously controlled by a command signal limiter arrangement 50 having a summing network 51. This network 51 is controlled by various aircraft flight condition or aircraft performance and flight control system operation responsive devices comprising an accelerometer 52, an angle of attack sensor 53, a stabilator position transmitter 54, a pitch rate signal generator 55, and a Mach signal generator 56. It will be apparent that the command signal limiter has its counterpart in FIGURE 1 of the aforesaid Rotier application and furthermore, that the discriminator portion 36 corresponds with discriminator amplifier 13 and amplifier portion 38 corresponds with the amplifier stage 11 of the aforesaid Rotier application. The fixed bias herein corresponds with the normal automatic pilot error signal similar to the output of amplifier 11 of the aforesaid Rotier application.

During the automatic steering apparatus standby mode in a prior arrangement, as when switch 40 herein engages contact 42, operation of the surface 10 by displacement of the pilot controller 17 results in changes in craft attitude which is sensed by conventional sensors 60 which unbalance the control network 39 of pitch axis control system 43. Such signals may be balanced by the operation of the trim piston 29 through interconnecting autopilot trim transmitting means 62 in a manner disclosed in the aforesaid Perkins patent.

Associated herein in novel manner with the servo engage switch arm 34 is a manual command signal limiting engage circuit comprising a source of D.C. voltage indicated in a simplified manner as a battery 65; a normally closed, momentarily open autopilot disengage switch 66; a relay 67, comprising an operating winding 68, operable arm 69 and contact 70; and conductor 71 extending from contact 70 to servo engage switch arm 34.

FIGURE 2 as stated discloses a preferred form of hydraulic servomotor 25 embodied in the invention but also utilized in the aforesaid Perkins patent 2,960,284. This servomotor 25 comprises the control valve 26 reversibly positioned by an electromagnetic torquer 74. The torquer 74 in turn is energized from the A.C. discriminator portion 36 of the servo-amplifier 37.

The control valve 26 through the differential pressure it supplies to conduits 32, 33 controls trim piston 29. Ram 29 normally operates in the standby mode a switching arrangement 76 having its operation transmitted by conducting means 62 to network 39, as more fully disclosed in the aforesaid Perkins application, to balance the network 39 of the automatic steering arrangement 11. The switching arrangement 76 herein corresponds with a switching arrangement 431, FIGURE 4 of the aforesaid Perkins patent and it functions to supply the autopilot trim or synchronizing signal via conductor 62 to the balanceable network 39 as stated.

Servometer 25, in addition to the trim piston 29, includes a solenoid operated pilot valve 30 in its operated position in FIGURE 2 which controls the displacement of an engage valve 77 which permits differential pressure in conduits 32, 33 to be applied to main piston 24 for operation thereof. The operation of the pilot valve 30 is controlled by the aforesaid circuit involving the relay arm 34 and contact 35 and conductor 80. Conductor 80 extending from switch contact 35 extends to a conductor 81 corresponding with conductor 470 of the aforesaid Perkins application.

The main piston 24 of servometer 25, in addition to controlling the main power actuator, also operates a stabilator position signal voltage generator 54 for both the pitch axis control network 39 and limiter bridge 51 of the command signal limiter arrangement 50.

*Operation*

In the synchronizing of the automatic pitch attitude control system 43 to aircraft attitude or autopilot trim mode, manually operable switch arm 40 engages switch contact 41 and with solenoid winding 47 unenergized, signals in the balanceable network 39 of automatic steering section 43 through amplifier portion 38 and discriminator portion 36 of A.C. discriminator amplifier 37 energize torquer 74 resulting in displacement of spring centered control valve 26 from unoperated position whereby a differential pressure is applied to conduits 32 and 33. The trim piston 29 in response thereto moves in one direction or the other from mid-position and operates the switching arrangement 76 to supply a signal voltage that serves to balance the pitch axis network 39.

Thereafter if automatic steering is to be applied the solenoid valve winding 47 may be energized through conductor 81 corresponding with conductor 470 of the prior Perkins application, which results in displacement of the pilot valve 30 and subsequent displacement of the engage valve 77. Any differential pressure in conduits 32, 33 is applied to the main piston 24 of servo 25.

If desired however, and as incorporated with the above structure by the invention here the autopilot section 43 comprising network 39 may be placed alternatively in a standby condition, opening the pre-engage autopilot trim loop when operation of switching arrangement 76 balanced bridge 39, during which switch arm 40 is now operated to engage contact 42 thereby applying the fixed bias to discriminator portion 36 resulting in energization of torquer 74 and displacement of control valve 26. The valve displacement is in such direction that it results in a differential pressure in conduits 32, 33 causing the trim piston 29, FIGURE 1, to move rightward thereby permitting spring biased switch arm 34 to be separated from contact 35. On separation of switch arm 34 and contact 35, and with conductor 81 no longer separately energized as in automatic control, the pilot valve 30 FIG. 2 being spring biased assumes a position leftward from the position shown in FIGURE 2 so that due to the loss of operating pressure on its lower end engage valve 77, FIGURE 2 through its biasing means, moves downwardly closing ports leading to conduits 32, 33, and disconnecting main piston 24 from the conduits 32, 33.

At this time the pilot controller 17 may be operated to control the main power actuator 11 while the main piston 24 being connected to the pressure return line as more clearly shown in FIGURE 2 and thus being ineffective or disengaged offers no appreciable resistance to such manual operation of the pilot controller 17.

Monitoring or manual command signal limiting may be introduced or may supplement the manual control by manually closing solenoid held switch 67 with disengage switch 66 closed thereby engaging switch arm 69 with contact 70 thus energizing switch arm 34. Meanwhile, the aircraft, under response to control surface 10 due to operation of the pilot controller 17, may change its angle of attack, pitch rate, Mach, or normal acceleration which signals are applied to the limiter network 51. The output of this network 51 modifies the fixed bias voltage from source 44 tending to decrease the total voltage on discriminator portion 36. This results in the decrease in energization of the torque winding 74, reduction in displacement of control valve 26, and consequent decrease in the differential pressure in conduits 32, 33. Since the trim piston 29 is spring biased, it will with decrease in differential pressure move leftward in FIGURE 1. When there is no appreciable differential pressure in conduits 32, 33, the piston 29 causes energized switch arm 34 to engage resilient contact 35 energizing winding 47 displacing rightwardly in FIG. 2 a movable member of pilot valve 30 applying operating pressure to valve 77 and in effect "engaging" the main piston 24 with the source of differential fluid pressure for subsequent operation of the ram 24. Thus, when manual control of surface 10 causes the aircraft to respond and produce various control quantities in limiter bridge 51 which quantities together equal the limit function, the main servo piston 24 is "engaged" so that its operation is reflected in movement of the pilot controller 17 and control surface 10. The limiter network 51 thereafter if the limit function be exceeded may supply additional control to torquer 74 resulting in a differential pressure in conduits 32, 33 which would ordinarily cause the main piston 24 to move toward the left in FIG. 1 resulting in downward displacement of the control surface 10 and nosedown of the aircraft. The command signal limiter 50 thereby prevents flight conditions of the aircraft to attain such value that the craft attains high pitch up attitudes or is over stressed.

Since the pilot operated control 17 is structurally integrally connected with the servomotor main piston 24, termed in parallel therewith, and should the pilot of the craft apply a pressure to the manual controller 17 tending to move the main piston 24 leftward in FIGURE 1, thereby causing or commanding a nose down displacement of control surface 10, such action tends to increase the pressure in conduit 33 resulting in trim piston 29 being displaced rightwardly thus separating switch arm 34 from contact 35 and disengaging the servo piston 24. Thus, he may manually disengage piston 24 and thereby disconnect limiter control and control the craft independently of the limiter operation of main servo piston 24.

On the other hand, if the pilot applied force on the manual controller 17 tends through the integral connection to move the servomotor main piston 24 rightwardly in FIGURE 1, such action tends to increase the pressure in conduit 32 with respect to the pressure in conduit 33 thereby enforcing or hastening the engagement of energized switch arm 34 and resilient or yieldable contact 35 and thus, the "engagement" of the main piston 24 with the main actuator 11.

During the time that switch arm 40 FIGURE 1 is in the "normal" position for direct manual control and craft response below the limit function magnitude the trim piston 29, FIGURE 1, is to the right from its normal centered position wherein energized switch arm 34 engages resiliently pivoted contact 35, and no synchronizing signal or trim signal is applied from the pitch axis bridge balancing switching arrangement 76 to the balanceable network 39. Thus unnecessary operation of the switch means 76 is avoided while control from system 43 is not selected. However, if switch arm 40 is moved to abut contact 41 to preselect control from system 43 and permitting piston 29 to move in accordance with the unbalance in bridge 39 and if the circuit of switch 67 be opened deenergizing switch arm 34, only a brief time period is required to provide a signal from switch means 76 to balance bridge 39 before actually applying control from system 43.

A momentary disengage delay device 72 is incorporated in parallel with the MCSL trim ram operated, energized switch 34. Normally minor transient pressure fluctuations about the zero differential pressure level in conduits 32, 33 would engage and disengage arm 34 from contact 35 and would cause high frequency cycling of the servo engage valve solenoid. Therefore, some disengage delay is necessary, but conventional delay circuits of .5 second or more caused the system to "hang up" when the pilot wished to leave the limit boundary. For this reason circuit device 72 provides a minimum engagement time of .25 second, i.e., provides a short, approximately one-fourth second, disengage delay immediately after the MCSL system 50 engages the servo ram 24. However, if the servo remains engaged longer than one-fourth second, and should the pilot through stick 18 cause switch arm 34 and contact 35 to disengage then no disengage delay exists. This, in effect, eliminates high frequency engage-disengage cycling without adding the undesirable "hang up" of a constant disengage delay.

It will now be apparent that I have provided a novel manual command signal limiting arrangement which functions during the direct manual operation of the manual controller of the aircraft and thus of the control surface of the craft to engage a servomotor with such control surface to enable the servomotor to operate the surface and thereafter automatically control the servomotor and control surface 10 to prevent excessive pitch up attitudes and over stress of the craft, and wherein force on the manual controller in one direction will hasten such servomotor engagement if the force is in a direction tending to over stress the craft or cause response of the craft tending to exceed a limit function or will delay such engagement if the force on the manual controller is in a direction tending to decrease the stress on the craft. While the details of the invention as described above may be modified by those skilled in the art while retaining the same result and without departing from the spirit and scope of the invention, the limits thereof are defined by the following claims.

What I claim is:

1. In an automatic steering apparatus for an aircraft having attitude changing means, in combination: a hydraulic servomotor; control means to render effective or ineffective the servomotor to operate said attitude changing means; manual means directly controlling said attitude changing means; and aircraft flight response condition monitoring means including flight condition sensing means effective when the craft response condition attains a predetermined limit magnitude effective both to operate said control means rendering said servomotor effective to operate said attitude changing means and controlling said servomotor to displace said attitude changing means to cause the craft flight condition to stay within the predetermined limit.

2. In an automatic steering apparatus for an aircraft having attitude changing means and means comprising a pilot stick for directly controlling said attitude changing means, in combination: a hydraulic servomotor connected in parallel to said pilot stick so that fluid pressure operation of said servomotor causes movement of said stick; control means to render operable or render inoperable the fluid pressure operation of the servomotor to control said attitude changing means whereby said attitude changing means may be manually operable by the pilot stick independently of said servomotor; flight condition monitoring means sensing changes in flight condition occurring during manual control; first means responsive to said monitoring means for operating said control means to render said servomotor responsive to fluid pressure; and further means controlled by said monitoring means for thereafter varying said fluid pressure thus operating said servomotor by fluid pressure to cause the aircraft flight condition to stay within a predetermined limit.

3. In an automatic steering apparatus for an aircraft having attitude changing means, in combination: a hydraulic servomotor operating said attitude changing means; a pitch axis automatic pilot selectively controlling said servomotor; manually operable pilot means for directly controlling said attitude changing means; first operable control means rendering said automatic pilot ineffective on said servomotor; second operable control means to render effective or ineffective the servomotor to control said attitude changing means; aircraft flight condition monitoring means sensing changes in flight condition during manual control; further means responsive to said monitoring means and operating said second operable control means when a flight condition attains a predetermined limit rendering said servomotor effective to control said attitude changing means; and additional means responsive to said monitoring means thereafter controlling said servomotor to cause the aircraft flight condition to stay within the predetermined limit.

4. In an automatic steering apparatus for a dirigible craft having a main power actuator operating attitude changing means thereon, in combination: a ram-type servomotor having two fluid transmitting passages communicating with opposite sides of said ram, a servomotor engage valve having passage blocking and non-blocking portions for controlling flow of fluid from the passages to the ram, and said servomotor being operable to reversely control the main actuator; further means responsive to predetermined differential pressure in said passages controlling the position of said engage valve to place it in passage blocking position to render the ram inoperable by said differential pressure; manual means operating said main actuator to alter craft attitude while the ram is so inoperable; and sensing means responsive to a condition of the craft while undergoing the manually ordered change in attitude connected for altering said differential pressure and effective on a predetermined magnitude thereof operating said engage valve passage unblocking position to render the ram operable; and further means responsive to the sensing means altering said differential pressure to operate said ram.

5. In an automatic steering apparatus for a dirigible craft having attitude changing means, in combination: a ram type servomotor having two fluid transmitting passages, operable means comprising a servomotor engage valve controlling flow of fluid from the passages to the ram, and said servomotor being operable to reversely control the attitude changing means; means including a second ram responsive to differential pressure in said passages and connected to the operable means for controlling said engage valve at an initial magnitude of differential pressure to render the ram inoperable by said differential pressure; manual means operating said attitude changing means to alter craft attitude while the ram is inoperable; and sensing means responsive to a condition of the craft while under the manual ordered change in attitude altering said differential pressure whereby when the magnitude of differential pressure is below a selected magnitude said second ram controls the engage valve and thus renders the first ram operable and responsive to further change in said differential pressure in the same direction.

6. In an automatic steering apparatus for a dirigible craft having an attitude changing means, a fluid operated, ram type servomotor having two fluid transmitting passages, an on-off engage valve controlling flow of fluid from the passages to the ram, and operable to control the attitude changing means; control means responsive to differential pressure in said passages above a selected magnitude controlling said engage valve to render the ram inoperable by said differential pressure; manual means in parallel to said servomotor operating said attitude changing means to alter craft attitude while the ram is inoperable; and sensing means responsive to a condition of the craft such as G loading, while under the manual ordered change in attitude altering said differential pressure from the selected magnitude whereby on predetermined magnitude thereof said control means operates said engage valve to render the ram operable; said sensing means on further alteration of said differential pressure in the same sense operating said ram.

7. On an automatic steering system for an aircraft having attitude changing means, a fluid operated, ram type servomotor having a pair of fluid transmitting passages communicating with opposite sides of said ram, an on-off engage valve controlling flow of fluid from said passages to said ram for operation thereof on existence of differential pressure, said servomotor operating said attitude changing means; a manually operable pilot controller integrally connected to the servomotor ram and thus in parallel with the servomotor and directly operating the attitude changing means; condition sensing means altering the differential pressure in said passages; control means, responsive to a predetermined differential pressure in said passages, controlling said engage valve to render the ram operable by said differential pressure, said control means being responsive to subsequent change in differential pressure caused by force on the pilot controller in one direction tending to decrease the condition controlling the engage valve to render the servomotor inoperable by said differential pressure.

8. In an automatic steering system for an aircraft having attitude changing means, a fluid operated type servomotor operating said attitude changing means, said servomotor having a pair of fluid transmitting passages; a two position valve controlling flow of fluid through said passages for operation of said servomotor upon differential pressure in said passage; an operable controller in parallel with said servomotor and directly operating the attitude changing means; sensing means responsive to aircraft performance altering the differential pressure; control means responsive to a predetermined differential pressure in said passages controlling said valve to render the servomotor operable by said differential pressure, said control means being responsive to subsequent change in differential pressure caused by force on the controller in one direction tending to decrease aircraft performance controlling the valve to render the servomotor inoperable by said differential pressure and responsive to change in differential pressure caused by opposite force on the controller controlling the valve to render the servomotor operable by said differential pressure.

9. In an automatic steering system for mobile craft having attitude changing means; a fluid operated servomotor operating said attitude changing means; a manually operable pilot controller in parallel with said servomotor and directly operating said attitude changing means; sensing means responsive to craft performance controlling differential pressure; control means connected to the sensing means and responsive to differential pressure of one phase in excess of a selected magnitude rendering the servomotor inoperable by the sensing means but rendering the servomotor operable when said pressure varied by the sensing means and caused by operation of the pilot controller in one direction is less than said magnitude, said control means thereafter being responsive to subsequent change in differential pressure caused by force on the pilot controller in the opposite direction tending to decrease craft performance in said one direction to render the servomotor inoperable.

10. In an automatic steering apparatus for an aircraft having attitude changing means, in combination: a servomotor for operating said attitude changing means; control means to render said servomotor effective or ineffective to operate said attitude changing means; manually operable pilot means, in parallel with said servomotor, operating said attitude changing means; craft flight condition monitoring means defining a limit for said craft flight condition due to operation of the pilot means and on attainment thereof operating said control means and rendering said servomotor effective to operate said surface said monitoring means with the servomotor thus effective thereafter controlling said servomotor to cause the aircraft flight condition to remain within said limit.

11. In an automatic steering apparatus for an aircraft having attitude changing means, in combination: a fluid operated servomotor; on-off fluid flow control means to render effective or ineffective said servomotor on said attitude changing means; manual means in parallel with said servomotor controlling said attitude changing means; an A.C. voltage discriminator amplifier; means for applying an A.C. bias to said discriminator; flight condition monitoring means applying an A.C. signal for also controlling said discriminator; means responsive to said discriminator operating said on-off control means to on position when the signal equals the bias to enable operation of said attitude changing means by said servomotor and for thereafter controlling said servomotor upon further increase in said condition from said flight condition monitoring signal through said discriminator to cause the aircraft flight condition to remain within a predetermined limit.

12. An automatic flight condition limiting arrangement for an aircraft having attitude changing means comprising: a manually operable pilot controller directly normally operating said attitude changing means; a normally inoperable servomotor for said attitude changing means, in parallel with said pilot controller; monitoring means adapted to provide a maximum predetermined permissible control signal indicative of the magnitude of the flight condition of the craft; and means including switching means controlled by said monitoring means on provision of a predetermined signal rendering said servomotor operable and thereafter controlling said servomotor by said monitoring means in response to further increase in said condition.

13. An automatic flight condition limiting arrangement for an aircraft having attitude changing means comprising: a first operable controller normally operating said attitude changing means; a normally inoperable servomotor for said attitude changing means in parallel with said first controller; monitoring means of a flight condition of the craft adapted to provide a maximum permissible predetermined signal; and switching means controlled by said monitoring means on provision of the predetermined signal rendering said servomotor operable and thereafter controlling said servomotor by said monitoring means.

14. An automatic flight condition limiting arrangement for an aircraft having attitude changing means comprising: a first operable controller normally operating said attitude changing means; a normally inoperable servomotor for said attitude changing means in parallel with said first controller; monitoring means of a flight condition of the craft resulting from operation of the first controller adapted to provide a signal continuously varying with said flight condition; and swtiching means controlled by said monitoring means and effective on provision of a predetermined signal rendering said servomotor operable and thereafter controlling said servomotor by said monitoring means, said servomotor being subsequently rendered inoperable upon change in the output of the monitoring means from said predetermined signal.

15. An automatic flight condition limiting arrangement for an aircraft having attitude changing means comprising: a first operable controller normally operating said attitude changing means; a normally inoperable servomotor for said attitude changing means, in parallel with said first controller; monitoring means responsive to a flight condition of the craft due to operation of said first controller providing a continuously variable signal in accordance with said flight condition; and means including switching means controlled by said monitoring means and effective on provision of a predetermined signal rendering said servomotor operable and thereafter controlling said servomotor in accordance with the difference between the monitoring means signal and the predetermined signal, said servomotor being rendered inoperable when the monitoring means signal is less than the predetermined signal.

16. An automatic flight condition limiting arrangement for an aircraft having attitude changing means comprising: a manually operable pilot controller normally operating said attitude changing means; a normally inoperable servomotor connected in parallel with said pilot controller to said attitude changing means; a discriminator amplifier for controlling said servomotor; biasing means for said discriminator; moveable means controlled by a sizeable output of one phase of the discriminator rendering said servomotor inoperable by said discriminator; monitoring means of a flight condition of the craft connected to said discriminator to modify the effect of the biasing means causing reverse displacement of said movable means; and means controlled by said movable means during reverse displacement thereof rendering said servomotor operable by said discriminator.

17. An automatic flight condition limiting arrangement for an aircraft having attitude changing means comprising: a first operable controller normally operating said attitude changing means; a normally inoperable fluid type servomotor in parallel with said first controller for said attitude changing means; means displaceable from a normal position rendering said servomotor inoperable; a voltage sensitive discriminator controlling said displaceable means; biasing means connected to the discriminator causing displacement of the displaceable means from the normal position; and command signal limiting means responsive to a flight condition of the craft resulting from operation of the first controller connected to the discriminator for modifying the effect of the biasing means thereby rendering the servomotor operable and thereafter controlling said servomotor from said command signal limiting means.

18. In an automatic steering apparatus for an aircraft having attitude changing means, in combination: a servomotor for operating said attitude changing means; control means for said servomotor; manual means integrally connected with said servomotor and thus operable in parallel therewith and operating the attitude changing means; aircraft flight condition sensing means effective when the craft flight condition resulting from operation of the manual means attains a predetermined limit, such as excessive G loading, operating said servomotor to cause the craft flight condition to depart from the predetermined limit.

19. In flight control apparatus for an aircraft having attitude changing means, a servomotor for displacing said attitude changing means and normally operatively disengaged therefrom, a craft flight condition sensing and monitoring variable signal providing means, and means controlled by the sensing means signal magnitude for operatively engaging said servomotor with the attitude changing means and thereafter also additionally controlling displacement of the servomotor by said signal to thus control said flight condition.

20. The apparatus of claim 19, a manually operable controller controlling said attitude changing means while said servomotor is operatively disengaged therefrom and controlling the flight condition of the craft.

21. The apparatus of claim 4, and means connecting the manual means and servomotor in parallel to said actuator whereby overriding pressure applied to said manual means affects said further means and causes placement of the engage valve to passage blocking position.

References Cited in the file of this patent

UNITED STATES PATENTS

| | | |
|---|---|---|
| 2,188,834 | Fischel et al. | Jan. 30, 1940 |
| 2,936,135 | Zupanick et al. | May 10, 1960 |
| 2,945,647 | Bell | July 19, 1960 |
| 2,953,329 | Ciscel | Sept. 20, 1960 |
| 2,991,028 | Sedgfield et al. | July 4, 1961 |